United States Patent
Khanna et al.

(10) Patent No.: US 6,442,610 B1
(45) Date of Patent: Aug. 27, 2002

(54) ARRANGEMENT FOR CONTROLLING NETWORK PROXY DEVICE TRAFFIC ON A TRANSPARENTLY-BRIDGED LOCAL AREA NETWORK USING TOKEN MANAGEMENT

(75) Inventors: Arun Girdharilal Khanna; Arunkumar Bhushappagala Thippeswamy, both of Cupertino; Frank Gerard Bordonaro, Los Gatos, all of CA (US); Scott Allan Bales, Durham, NC (US); Uwe Sellentin, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/342,538

(22) Filed: Jun. 29, 1999

(51) Int. Cl.[7] .............................................. G06F 15/16
(52) U.S. Cl. ..................... 709/227; 709/223; 370/229; 370/356; 370/401
(58) Field of Search ................................. 709/223, 227, 709/224, 249; 370/229, 356, 401

(56) References Cited

U.S. PATENT DOCUMENTS

| | | | | |
|---|---|---|---|---|
| 5,805,805 A | * | 9/1998 | Civanlar et al. | 370/409 |
| 6,061,728 A | * | 5/2000 | Mead et al. | 709/227 |
| 6,085,243 A | * | 7/2000 | Fletcher et al. | 709/224 |
| 6,189,042 B1 | * | 2/2001 | Keller-Tuberg | 370/405 |

* cited by examiner

*Primary Examiner*—Krisna Lim
(74) *Attorney, Agent, or Firm*—Leon R. Turkevich

(57) ABSTRACT

A transparently-bridged wide area network connecting Ethernet/IEEE 802.3-based local area networks uses redundant proxy devices one each LAN for internetwork communications. The proxy devices on a given LAN, implemented as data link switching (DLSw) devices, mediate for proxy services by generation and maintenance of a token between the proxy devices capable of providing the corresponding proxy services. In the case of transfer of a data frame, a proxy device having received a frame from an end station determines whether any other proxy device possess a token authorizing the establishment of a circuit connection via a wide area network for transfer of the frame to another local area network. If the proxy devices determines that another proxy device possess the token, the proxy device lacking the token drops the frame. If the proxy device possesses the token, then the frame can be transferred via the wide area network. Multiple tokens may be used for distributing distinct proxy services between multiple proxy devices. In addition, each proxy device lacking a token monitors for the periodic presence of a "heart-beat" indicating the continued presence of tokens, enabling generation of new tokens if existing tokens are lost. Hence, redundant DLSw-type proxy devices may be implemented on a local area network while maintaining a stable and a robust communications system.

44 Claims, 5 Drawing Sheets

ARRANGEMENT FOR CONTROLLING NETWORK PROXY DEVICE TRAFFIC ON A TRANSPARENTLY-BRIDGED LOCAL AREA NETWORK USING TOKEN MANAGEMENT

BACKGROUND OF THE INVENTION

1. Field of the Invention

The present invention relates to transparent bridging technology, more particularly to arrangements for providing transparent bridging between local area networks having multiple proxy devices serving as entry points for communication across a wide area network.

2. Description of the Related Art

Transparent bridging technology is a popular mechanism for interconnecting local area networks. Transparent bridges, popular in Ethernet/IEEE 802.3 Networks, are so named because their presence and operation are transparent to network hosts. When transparent bridges are powered on, they learn the network topology by analyzing the source address of incoming frames from all attached networks. If, for example, a bridge sees a frame arrive on line 1 from host A, the bridge concludes that host A can be reached through the network connected to line 1. Through this process, transparent bridges build a table that can be used for traffic forwarding.

Once the bridge has built a forwarding table, the bridge can forward a frame, received on one of the bridge ports, by looking up the frame's destination address in the forwarding table. If the forwarding table contains an association between the destination address and any bridge port other than the inbound port having received the frame, the bridge outputs the frame on the indicated port. If no association is found, the frame is flooded to all ports except the inbound port.

A design assumption with transparent bridging is for any particular media access control (MAC) address at any particular time, there will be at most one path through the transparent bridged network by which that MAC address can be reached. This design assumption is typically implemented through the use of the spanning-tree algorithm, which detects and eliminates any loops created by two or more transparent bridges by causing a sufficient number of bridge ports to enter a "blocking" mode. By eliminating all loops in the network, the only way a MAC address could be reachable through the multiple paths would be if more than one device advertised the same MAC address; since it is a violation of the IEEE 802.3 specification for an individual MAC address to be used by more than one device within a bridged network, the reachability of a MAC address by multiple paths is normally not an issue.

A limitation of transparent bridging technology is that there is no information contained within a packet to inform the bridge device the path from where the packet came, or the path to where the packet is destined. For example, the IEEE 802.5 token ring LAN specification describes source-route bridging (SRB) as a technique for bridging local area networks. Source-route bridging algorithms add the complete source-to-destination route in all inter-LAN frames sent by the source, such that all source route bridges store and forward the frames as indicated by the route appearing in the appropriate frame field.

FIG. 1 is a diagram illustrating an exemplary source-route bridged network 10. Assume that host X in FIG. 1 wishes to send a frame to host Y, and that initially host X does not know whether host Y resides on the same token ring (IEEE 802.5) local area network (LAN 1) or a different LAN segment. Hence, host X sends out a test frame onto LAN 1. If the test frame traverses around the token ring of LAN 1 and returns to host X without a positive indication that host Y has seen the test frame, host X assumes that host Y is on a remote LAN segment. To determine the remote location of host Y, host X then sends an explorer frame. Each bridge 12a, 12b receiving the explorer frame copies the frame onto all outbound ports. Route information is added to the explorer frames as they travel through the internetwork 10 via bridges 12c and 12d. When the explorer frames initially generated by host X reach host Y on LAN 2, host Y replies to each received explorer frame using the accumulated route information. Upon receipt of all response frames that specify their respective paths, host X chooses a path based on predetermined criteria.

The route information is accumulated in a routing information field (RIF), specified under IEEE 802.5. A RIF is included only in those frames destined for other LANs, and the presence of routing information within the frame is indicated by the setting of the most significant bit within the source address field, called the routing information indicator (RII) bit.

As readily apparent from the foregoing, a limitation of transparent bridging technology is that there is no RIF functionality in IEEE 802.3 based networks, hence there is no information contained within a packet to inform the bridge device from where the packet came, or to where the packet is destined. This limitation is readily apparent from conventional Ethernet IEEE 802.3 networks as a packet will only have one path through a network.

New mechanisms have been developed for reliable transfer of traffic from an Ethernet IEEE 802.3 local area network across a wide area network. The consequences of these advances is that limitations which were not crucial for local operation of the Ethernet/802.3 local area network have become more cumbersome. For example, there are certain devices (e.g., and stations) in the network, referred to as "proxies", which represent a large number of other devices (e.g., end stations) elsewhere in the network; traffic destined for these end stations are accepted by the proxies, and traffic from these end stations enter the transparently bridged LAN through these proxies. One common example of this type of proxy device is a data link switching (DLSw) peer device, as described in RFC 1795.

Data link switching (DLSw) was developed as a means of transporting IBM Systems Network Architecture (SNA) and Network Basic Input/Output System (NetBIOS) traffic over a IP Network. The DLSw serves as an alternative to source route bridging protocols that were used for transporting SNA and NetBIOS traffic in token ring environments. The principal difference between source route bridging and DLSw revolves around support of local termination. SNA and NetBIOS traffic rely on link-layer acknowledgements and keep-alive messages to ensure the integrity of connections and the delivery of data. For connection-oriented data, the local DLSw node or router terminates data-link control. Therefore, link-layer acknowledgments and keep-alive messages do not need to traverse a wide area network. DLSw nodes or routers use a switch-to-switch protocol (SSP) for establishment and maintenance of DLSw circuits across a wide area network. The DLSw nodes encapsulate packets in TCP/IP for transport on IP based networks, using TCP as a means of reliable transport between DLSw nodes.

The use of DLSw type proxy devices does not create a problem in conjunction with transparent bridging, so long as there is only one such proxy device connected to the transparently-bridged LAN, or so long as no set of two or more of these devices can provide proxy services for a particular MAC address. Hence, only a single proxy device may provide proxy services for a local area network segment, resulting in reliability concerns if the proxy device fails. As such, failure of a single network device such as the proxy could result in a loss of connectivity from a large number of end stations. However, efforts at improving network reliability by adding a redundant proxy seem unattainable as it violates the basic design assumption of transparent bridging.

This problem is readily apparent from the example of a proxy device attempting to establish a circuit connection across the wide area network at the same time that another proxy device on the same local area network also attempts to establish a circuit connection via the wide area network. This contention for circuit establishment may arise, for example, in response to reception of a frame transmitted by an end station on the local area network. Since proxy devices on the same local area network may attempt to provide proxy service for the same remote device, both proxy devices in this case may attempt to establish a circuit connection for the same transmitted packet. The contending proxy devices will thus establish duplicate circuits, resulting in a destructive operation within the network. Hence, the attempt to add multiple proxy devices for redundancy may result in the more adverse impact of interfering with the attempted establishment of circuit connections across the wide area network.

SUMMARY OF THE INVENTION

There is a need for an arrangement in a transparently-bridged wide area network, where proxy devices attached to the same LAN can share proxy services for end stations on a local area network, without interfering with each other.

There is also a need for an arrangement that eliminates contention between multiple proxy devices coupled to a local area network for providing proxy services to an end station on the local area network.

There is also a need for an arrangement in a transparently-bridged wide area network, where multiple proxy devices connected to the same local area network are able to mediate for services to be provided to an end station on the local area network, thereby avoiding contention for proxy services.

These and other needs are attained by the present invention, where each proxy device on a local area network mediates with other proxy devices using tokens to provide authorizations for establishment of a circuit connection. Proxy devices initially establish a communication between each other. Upon receiving a frame from an end station connected to the LAN, each proxy device capable of reaching the destination identified by the frame determines whether it has possession of the token. Hence, only the proxy device holding the appropriate token will be permitted to act on the frame, eliminating proxy contention issues. In addition, tokens are generated if the proxy devices determine that no other proxy device posseses the appropriate token. Finally, multiple tokens may be used for different destinations, such that a single token may be used to represent a subset of end stations on one local area network that provide communications over a wide area network to another local area network. Hence, multiple tokens may be used by the proxy devices for respective local area networks reachable via the wide area network.

According to one aspect of the present invention, a method is provided in a proxy device coupled to a local area network and configured for establishing a circuit connection with a second local area network via a wide area network. The method includes establishing a communication with at least a second proxy device coupled to the local area network, determining whether one of the proxy device and the second proxy device possesses a token authorizing establishment of the circuit connection for transfer of a frame, received from a first end station on the local area network, to the second local area network, and selectively transferring the frame to the second local area network based on whether the proxy device possesses the token.

According to another aspect of the present invention, a proxy device is provided that is configured for establishing a circuit connection between a local area network and another local area network via a wide area network. The proxy device includes a first network port for communication with a second proxy device via the local area network, a second network port for communication with the other local area network via the wide area network, and a control unit. The control unit is configured for establishing a communication link with the second proxy device and determining a presence of a token possessed by one of the proxy device or the second proxy device for establishment of the circuit connection, the control unit selectively transferring a frame received from an end station on the local area network to the other local area network based on the proxy device possessing the token.

Additional advantages and novel features of the invention will be set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF DESCRIPTION OF THE DRAWINGS

Reference is made to the attached drawings, where elements having the same reference numerals represent like elements throughout and wherein.

BEST MODE FOR CARRYING OUT THE INVENTION

Figure 1:
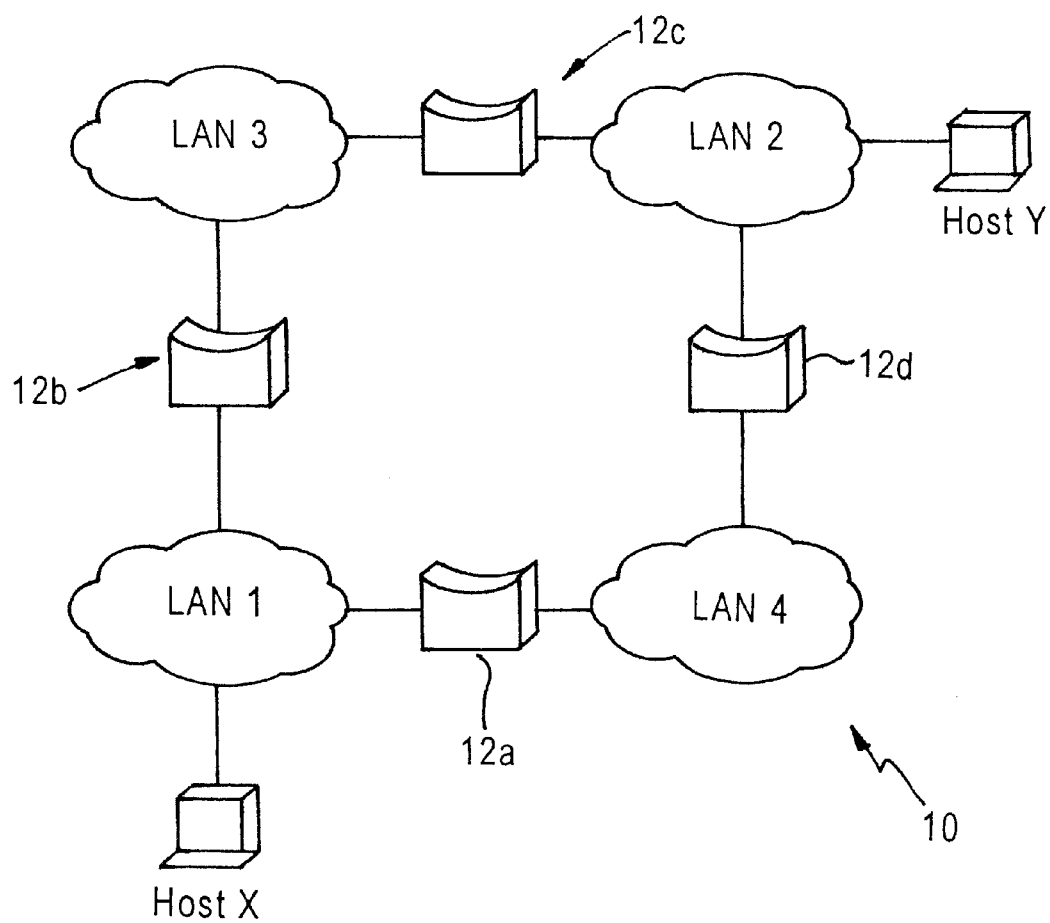
FIG. 1 is a block diagram of a conventional internetwork using source route bridging for interconnection of token ring-based local area networks.
Figure 2:
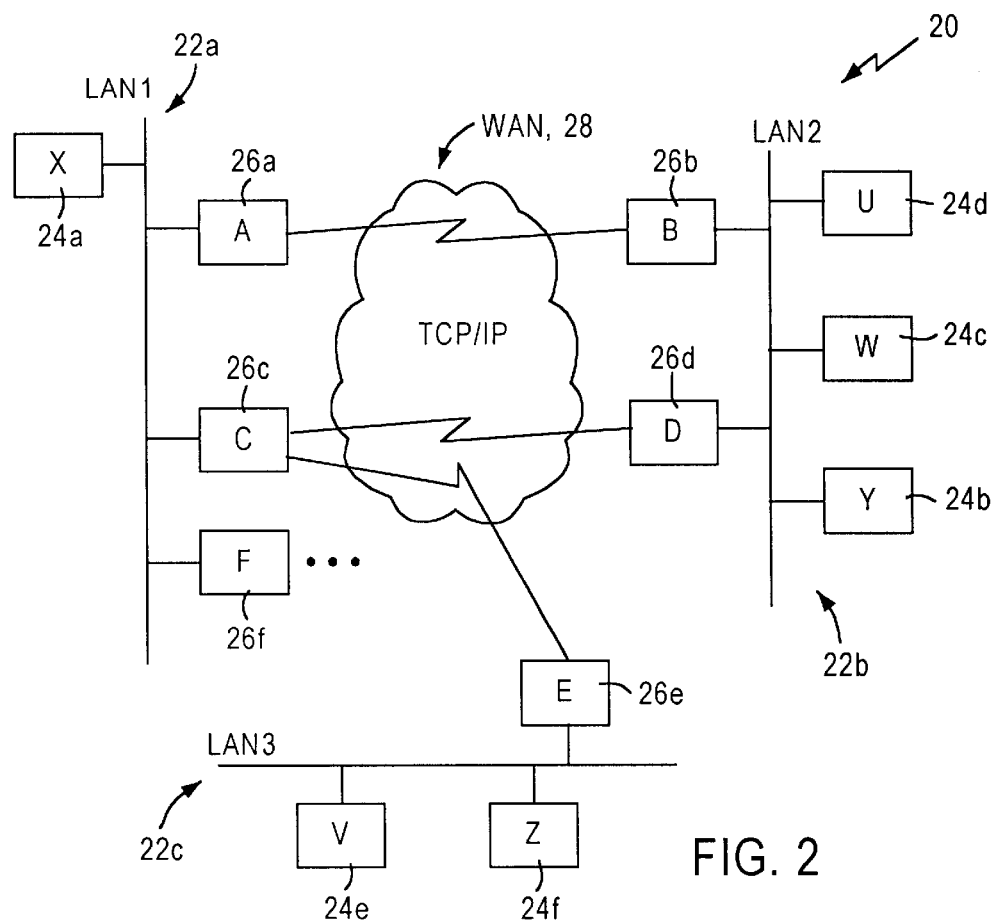
FIG. 2 is a block diagram of an arrangement for interconnecting local area networks across a wide area network using multiple proxy devices according to an embodiment of the present invention.

FIG. 2 is a block diagram illustrating an internetworking system 20 for communication of end stations across a wide area network according to an embodiment of the present invention. As shown in FIG. 2, the internetworking system 20 includes a first local area network 22a, a second local area network 22b, and optionally a third local area network 22c. Each local area network 22 typically includes end stations 24, and at least two proxy devices 26 coupled to the corresponding local area network 22 for communication across the wide area network (WAN) 28. For example, proxy devices 26a, 26c and 26f are coupled to LAN 22a, whereas proxy devices 26b and 26d are coupled to LAN 22b. Only proxy device 26e is shown as coupled to LAN 22c for simplicity. According to the disclosed embodiment, the LANs 22a, 22b and 22c are Ethernet IEEE 802.3-based local area networks. Hence, data packets transmitted on the LANs 22 have a source address and destination address, but no RIF field as found in token ring IEEE 802.5 networks.

As shown in FIG. 2, each proxy device 26 is configured for communication with at least one other proxy device 26 in another network 22. For example, proxy device 26a is configured for communication via WAN 28 with proxy device 26b, and proxy device 26c is configured for communication with proxy device 26d and 26e via the WAN 28. As such, proxy devices 26a and 26b are configured as peers, and proxy devices 26c and 26d are configured as peers for communications between LAN 22a and 22b across WAN 28. Proxy devices 26c and 26e are configured as peers, and proxy device 26f and another proxy device (not shown) are configured as peers for communications between LAN 22a and 22c. Each proxy device 26 may have multiple peers for communication with respective LANs.

According to the disclosed embodiment, each proxy device 26 is configured as a data link switching (DLSw) device, also referred to as a DLSw router, for transporting information between local area networks 22a, 22b and 22c according to the Internet Engineering Task Force (IETF) Request For Comments (RFC 1795).

The DLSw operational process involves three basic components, namely capabilities exchange, circuit establishment, and flow control. Capabilities exchange involves the trading of information about capabilities associated with a proxy device session. The exchange of information is negotiated when the session is initiated and during the course of session operations. Circuit establishment occurs between end systems, for example between nodes 24a and 24b, and includes locating the target end system and setting up data-link control connections, also referred to as circuit connections, between each end system (e.g., end station 24a) and its local router (e.g., proxy device 26a). DLSw flow control enables the establishment of independent, unidirectional flow control between DLSw partners 26a and 26b, 26c and 26d, 26c and 26e, etc.

As described above, the disclosed embodiment is directed to DLSw circuit establishment between a pair of end systems, for example 24a and 24b or 24a and 24f. Conventional systems assume that one and only one router 26 is connected to any local area network 22. For example, assume proxy devices 26a, 26c and 26f receive a SABME or XID message from the end station 24a via the local area network 22a that specifies "X" as a source address and "Y" as a destination MAC address for end station 24b. The SABME (Set Asynchronous Balanced Mode Extended) or XID messages are logical link control (LLC) level type-2 (LLC2) messages used to establish connections for transmission of data between end stations 24. Each LLC2 connection uses a single DLSw circuit across the WAN 28.

According to RFC 1795, the reception by a proxy device (e.g., 26a) of a SABME frame, or an exchange identifier (XID) frame in SNA architectures by IBM, would start an LLC2 connection. Normally a proxy device 26 that recognizes that an end station is reachable (e.g., 26a) would respond to a SABME frame or XID frame by sending a "canureach-circuit start" frame (CUR-CS) to a corresponding peer device (e.g., 26b) based on the destination MAC address in the detected frame. For example, in response to receiving the message on LAN 22a that specifies "X" as a source MAC address and "Y" as a destination MAC address, each proxy device 26a and 26c would send a CUR-CS message to the corresponding peer device 26b and 26d, respectively. Note the proxy device 26f would not output the CUR-CS frame because it recognizes that it cannot reach MAC address "Y". Normally the peer 26b would send the SABME or XID message to the end station 24b, at which point the end station 24b would respond with a UA frame for a SABME request and another XID response to the XID request. If each LAN 22a had only one proxy 26 (e.g., 26a), the corresponding peer (e.g., 26b) would respond to the CUR-CS with an "icanreach-circuit start" (ICR-CS) message, enabling a circuit connection to be established between peers 26a and 26b. The circuit between peers 26a and 26b would not reach a connected state until the end station 24a received the UA or XID response from the local proxy device 26a.

As readily apparent from the foregoing, an LLC2 connection normally cannot be established if there are two or more proxy devices 26a and 26c on the same LAN 22a contending for proxy services for the end station 24a. Using the above example, if proxy devices 26a and 26c were both to forward CUR-CS frames in response to detecting the SABME or XID frames from end station 24a, the end station 24b would receive two requests, and either respond to both requests or reject both requests. Even if both responses (ICR-CS) were transmitted back across the WAN 28, the detection of two responses (e.g., UA or XID) transmitted by the proxy devices 26a or 26c would cause the end station 24a to break down the connection.

According to the disclosed embodiment, one or more "tokens" are generated and passed between proxy devices 26 connected to the same LAN 22. In particular, the token authorizes establishment of a circuit connection between proxy peers via the WAN 28 for transfer of a frame. Hence, the proxy device 26 having possession of a token can transfer the frames across the WAN 28, and then decide whether to retain the token or forward the token to another proxy device 26 on the transparently-bridged LAN 22.

In addition, the presence of multiple end stations 24 on a local area network 22 results in the scenario where not every one of the proxy devices 26 are necessarily providing the same proxy services to all the devices. Hence, another aspect of the disclosed embodiment is that multiple tokens may be used on the same transparently-bridged local area network 22, where each token is used to authorize a corresponding set of proxy services. Hence, different proxy devices 26 may share different tokens depending on the particular capabilities of each proxy device and the nature of the proxy services provided, described below.

Figure 3:
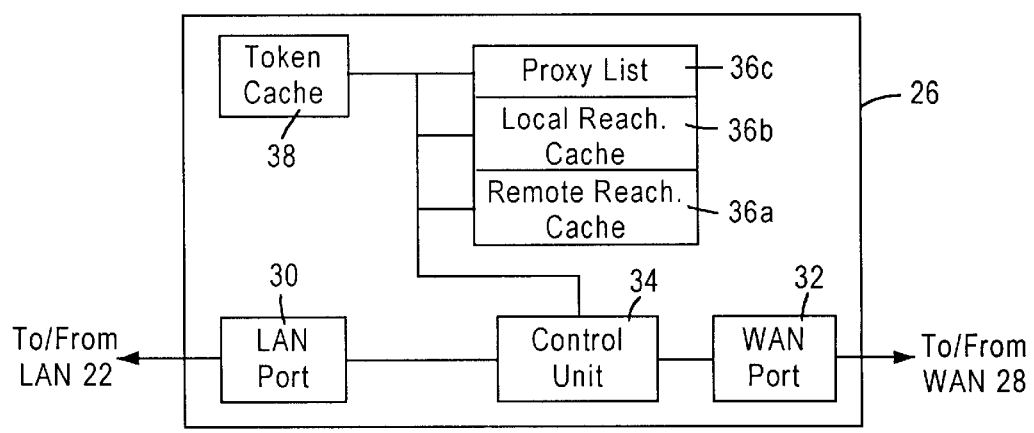
FIG. 3 is a block diagram illustrating in detail the proxy device of FIG. 2.

FIG. 3 is a block diagram illustrating a proxy device 26 according to an embodiment of the present invention. The proxy device 26 is preferably implemented as a DLSw router configured in accordance with RFC 1795. The proxy device includes a LAN port 30 for sending and receiving data from network nodes for an associated LAN 22 according to the local area network protocol, for example Ethernet/ IEEE 802.3 protocol.

The proxy device 26 also includes a wide area network port 32 for sending and receiving messages onto the wide area network 28 using TCP/IP protocol. The proxy device 26 also includes a controller 34, and caches 36 that store addressing information for different network nodes that are reachable by the proxy device 26. The proxy device 26 also includes a token cache 38, described below. The remote reachability cache 36a stores MAC addresses corresponding to end stations 24 that are reachable only via the WAN 28. The local reachability cache 36b stores MAC addresses corresponding to end stations 24 the are reachable via the associated local area network 22. Hence, proxy devices 26a, 26c and 26f would store the MAC address ("X") for end device 24a in their respective local reachability caches 36b. The proxy list 36c stores the addresses of all reachable proxy devices 26, including actual connection peers as well as other proxy devices connected to the same local area network 22. For example, the proxy device 26a will store in its proxy list 36c the MAC address for proxy device 26c, and well as the network address for its corresponding peer 26b. Hence, the controller 34 can effectively identify network nodes that are reachable via the local area network 22, the wide area network 28, and whether any of those network nodes are end stations 24 or other proxy devices 26.

The token cache 38 stores tokens that are received by the proxy device 26. Hence, a control unit 34 accesses the token cache 38 to determine whether the proxy device 26 has possession of a given token. If the control unit 34 determines that the proxy device 26 is in possession of a particular token stored in the token cache 38, then the control unit 34 may then perform the appropriate processing for a frame, for example transferring a frame via the WAN 28 to the corresponding peer device. In addition, a proxy 26 (e.g., proxy device 26c) may be configured for providing multiple proxy services, for example forwarding frame to different local area networks 22b and 22c that are reachable by the proxy device 26c. As such, the token cache 38 may store a plurality of different tokens for respective proxy services at any given time.

Figure 4:
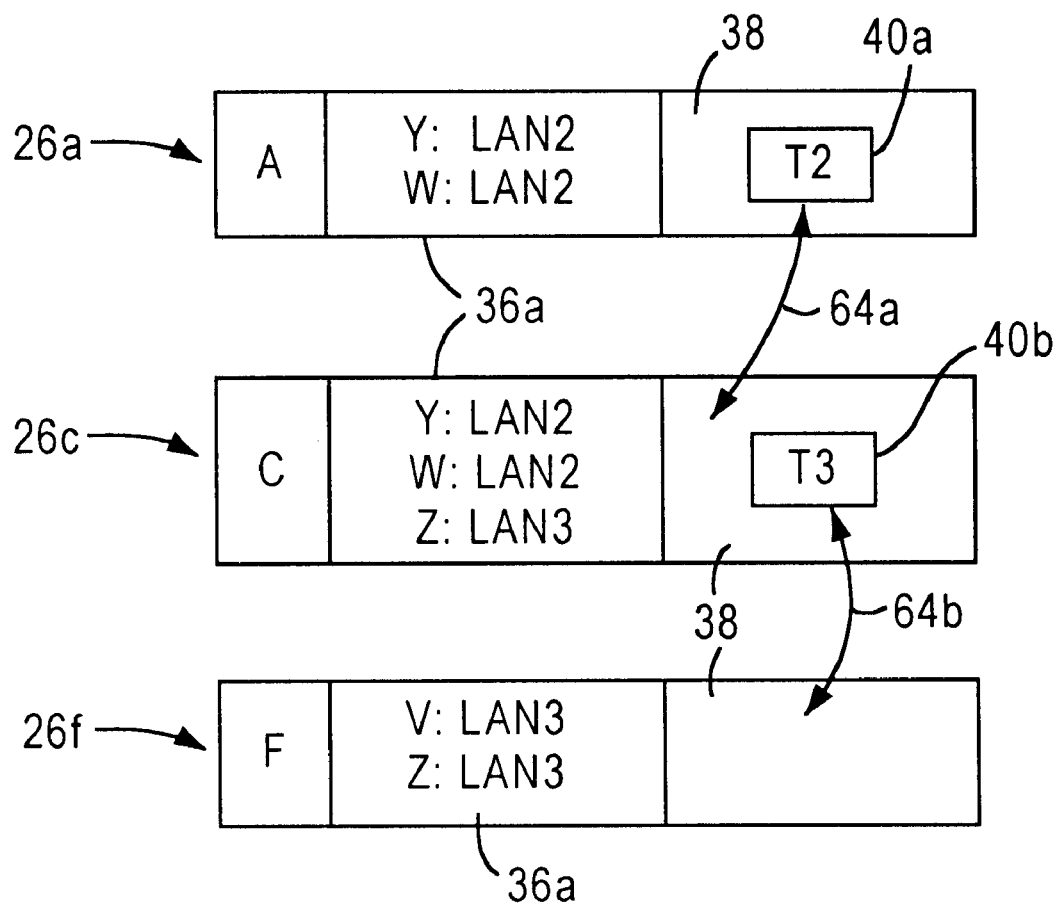
FIG. 4 is a diagram illustrating the passing of tokens between proxy devices of a local area network.

FIG. 4 is a diagram illustrating the passing of tokens 40 between different proxy devices 26 according to an embodiment of the present invention. The manner in which the authorization level for any given token is determined may vary depending on implementation. In extreme cases, it may be desirable to have a single token corresponding to each device 24 for which any proxy device 26 is providing service on that LAN 22. Preferably, however, each control unit 34 of each proxy device 26 will have a predetermined protocol for generation and the processing of tokens, where a single token may be used to represent an entire subset of multiple devices 24 on the LAN to reduce the token overhead between the proxy devices 26.

Regardless of the token representation scheme that is used, any particular end device 24 being represented by proxy devices 26 on a LAN 22 correspond only to a single token on that LAN, insuring that only the proxy device 26 having possession of the token may take the appropriate action on a frame received by the proxy device 26.

As shown on FIG. 4, each proxy device 26 either possesses at least one token 40, or monitors the continued existence of a token possessed by another proxy device 26. For example, proxy devices 26a and 26c share token 40a, which is used to authorize forwarding of a frame to the local area network 22b. The proxy devices 26c and 26f share the token 40b to identify which proxy device 26 has authorization to transmit a frame to the local area network 26c. As described below, each proxy device having possession of a token 40 periodically outputs status frames, also referred to as "heart-beat" frames, to the other proxy devices 26 to indicate the continued presence of the corresponding token 40. Hence, any proxy device 26 that does not possess the token (e.g., proxy device 26f), can monitor the status frames to detect the continued existence of the tokens by another proxy device; if the proxy device (e.g., 26f) monitoring the heart-beat frames does not detect the heat-beat frame within a prescribed interval, then the proxy device concludes that the token (e.g., 40b) is lost (e.g., due to a failure in the proxy device 26c or the corresponding LLC2 connection) and may generate its own new token to replace the lost token.

Figure 5A:
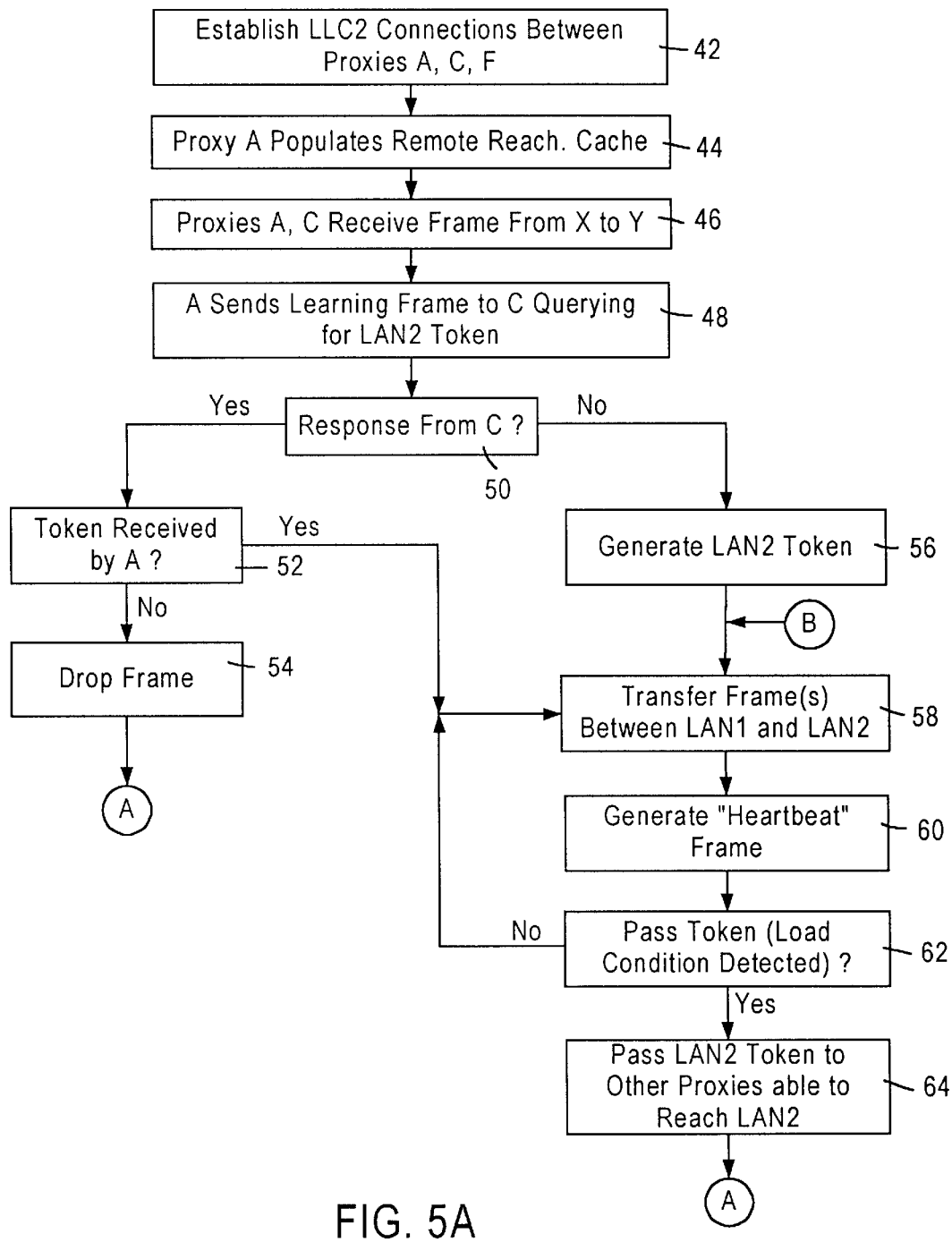
FIGS. 5A and 5B are flow diagrams summarizing the method for intercommunication between local area networks having multiple proxy devices according to embodiment of the present invention.
Figure 5B:
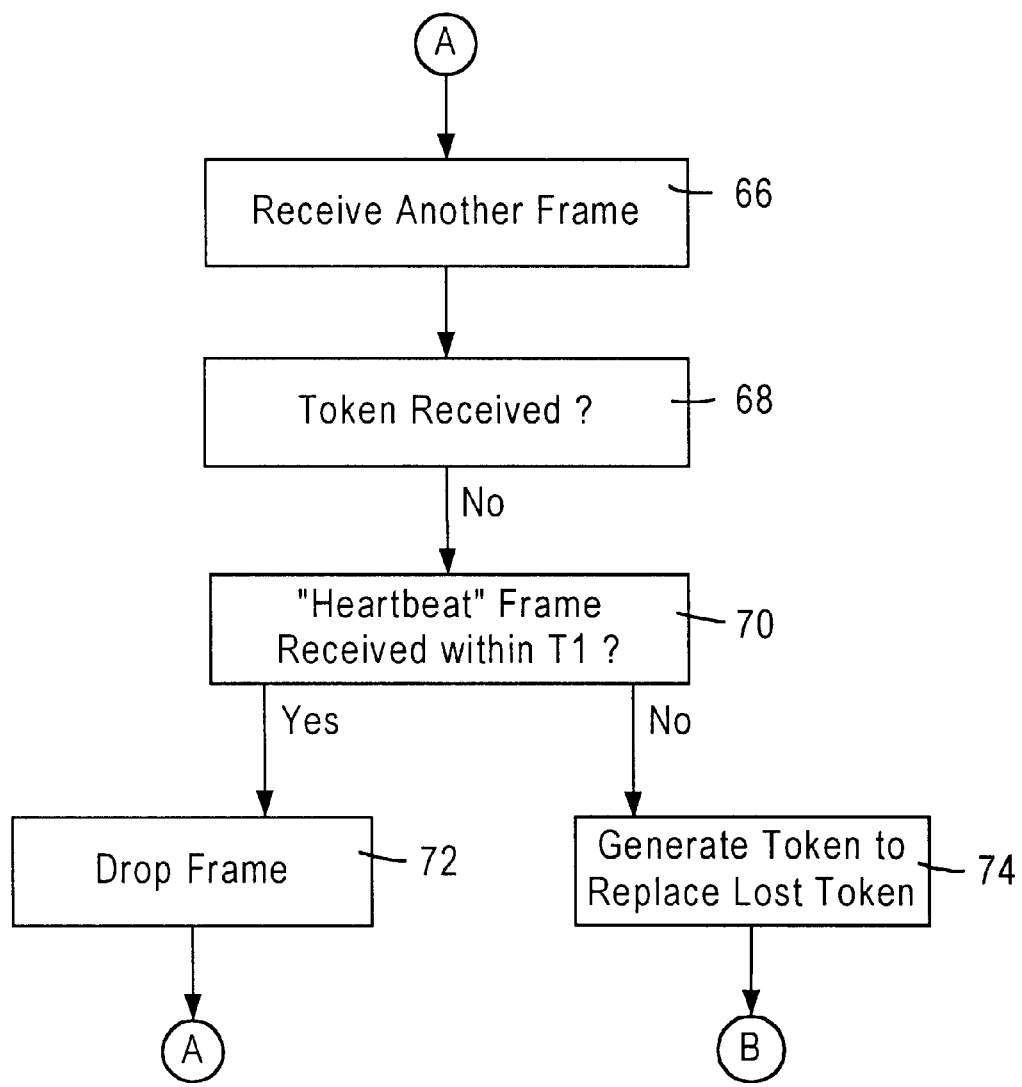

FIGS. 5A and 5B are flow diagrams summarizing the method for intercommunication between the local area networks 22 via the wide area network 28 according to an embodiment of the present invention. The method of FIGS. 5A and 5B is implemented, for example, by storing sequences of instructions on a computer readable medium in the control unit 34 and executing those stored instructions.

As shown in FIG. 5A, each of the proxy devices 26a, 26c and 26f on LAN 22a establish LLC2 connections between each other in step 42, enabling the proxy devices to advertise their respective addresses and capabilities. The LLC2 connections may also be used by the proxy devices 26 to determine the presence of a failure in any one of the proxy devices, described below.

Each of the proxy devices 26 then populate their remote reachability cache 36a with the MAC addresses of end stations reachable by the corresponding proxy device in step 44. For example, a control unit 34 of proxy device 26a populates the remote reachability cache 36a with the MAC addresses of end stations 24b, 24c and 24d based on the exchange of test and response frames between the end stations 24 and peer devices 26a and 26b via the WAN 28. Similarly, the proxy device 26c would populate its remote reachability cache 36a not only with the MAC addresses with end stations on LAN 22b via peer 26d, but also end stations on LAN 22b via peer 26e, creating the populated remote reachability caches 36a as illustrated in FIG. 4.

Assume next that the proxy devices 26a, 26c and 26f receive a frame from end station 24a having a destination address "Y" for end station 24b in step 46. The proxy device 26a, in response to receipt of the frame from end station 24a, outputs a learning frame onto the local area network 22a to the proxy devices (e.g., 26c) indicated as having the capability of reaching end station Y in step 48. The learning frame includes a query as to whether any other proxy device 26 possesses the token for sending a frame via the WAN 28 to the end station 24b, or more generally to the LAN 22b.

The control unit 34 of proxy device 26a then monitors in step 50 to determine whether a response is received from proxy device 26c with a prescribed interval indicating the existence of the token 40a. If the proxy device 26a receives a response from a proxy device 26c, the control unit 34 checks to see whether the response includes the token 40a passed from the proxy device 26c in step 52. If the control unit 34 determines that the token 40a has not been passed to the proxy device 26a but rather that the response is an acknowledgement of possession or a heart-beat frame, the control unit 34 of proxy device 26a drops the frame in step 54. However, if the control unit 34 determines in step 52 that the token 40a was passed, then the control unit 34 of proxy 26a is authorized to establish a circuit for transfer of the frame, and hence transfers the frame to the LAN 22b in step 58.

Note that if in step 50 the control unit 34 of proxy device 26a determines that no response is received from proxy device 26c within a prescribed interval, then the control unit 34 concludes that either no token has been generated, or has been lost due to a failure in the proxy device 26c. Hence, the control unit 34 of proxy 26a generates the token 40a in step 56, and transfers the frame in step 58.

Once a proxy device has possession of a token, the proxy device 26 may transfer a plurality of frames via the WAN 28 as authorized by the token 40. In addition, the proxy 26 having possession of the token 40 periodically generates a "heart-beat" frame as a status frame in step 60, indicating to other proxy devices of the existence of the token 40. The proxy device 26 will continue to retain possession of the token 40 until some prescribed event, for example, detecting a prescribed load balancing condition in the proxy device 26, or a circuit disconnect condition on the WAN 28, in step 62. For example, DLSw routers are able to detect circuit disconnects and determine how many circuits each peer 26 is currently handling; hence the proxy device 26 determines load balancing conditions based on the number of circuits each peer is currently handling.

In response to detecting the prescribed condition, the proxy device 26 having possession of the token passes the token 40 to another proxy capable of providing the same proxy services in step 64 to proxy 26c, shown in FIG. 4. For example, the proxy device 26c will pass the token 40a authorizing transfer to the local area network 22b of frames in step 64a to proxy 26c, shown in FIG. 4. Similarly, the proxy device 26c will pass the token 40b to proxy device 26f in step 64b, authorizing transfer of frames from the local area network 22a to local area network 22c.

Referring to FIG. 5B, the method continues from the perspective of a proxy device 26 that does not possess the token. As such, the control unit 34 receives another circuit initiation frame (e.g., SABME/XID) from the end station 24a in step 66, and checks the token cache 38 in step 68 to determine whether it possesses the appropriate token. Since in this case the control unit 34 determines that the proxy device 26 does not possess the necessary token 40, the control unit 34 checks in step 70 whether a status frame (e.g., a "heart-beat" frame) is received within a prescribed time interval (T1) from the proxy device possessing the token. If the control unit 34 determines that the heart-beat frame is received within the prescribed time interval (T1), then the proxy device 26a drops the frame in step 72. However, if in step 70 the control unit 34 of the proxy device monitoring for the continued presence of the token determines that no heart-beat status frame is received within the prescribed interval T1, then control unit 34 generates a new token in step 74 to replace the lost token. Note the proxy devices would generate the new token according to a protocol that ensures multiple proxy devices do not generate duplicate tokens.

Note that an additional level of tracking may be added depending on the environment in which the disclosed embodiment is to be implemented. For example, when a proxy device 26 handles a particular "critical frame" from the LAN 22 during the time that it holds the appropriate token, there may be a requirement that the same proxy device handle all similar critical frames that may be later broadcast on the LAN 22, regardless of whether that proxy device 26 still holds the token. In this case, the proxy would register this variation with all other proxy device 26 using that token 40 prior to token management. In this arrangement, if a proxy device 26 does not hold the token 40 to handle the resource, the control unit 34 would check the token cache 38 to see if the token was previously registered; if a match is found, the proxy device 26 could process the frame even though the corresponding token was possessed by another proxy device 26. Conversely, if the proxy device 26 holding the token checks to see whether any of the proxy devices are registered, the proxy device 26 may ignore the frame even though it holds the appropriate token. Hence, the protocol for establishing authorization for transferring a frame may be session-dependent or time dependent, where authorization remains with a proxy device even after passing of the token.

According to the disclosed embodiment, an arrangement using tokens for mediation of proxy services in establishment of circuit connections enables a transparently bridged network to use multiple proxy devices connected to the same transparently-bridged local area network. Hence, the disclosed arrangement eliminates the problems normally encountered with relying on a single proxy device as a gateway to cross a wide area network. Hence, the disclosed arrangement provides a more robust and reliable network that permits the use of redundant peers.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A method in a proxy device coupled to a local area network and configured for establishing a circuit connection with a second local area network via a wide area network, the method comprising:

establishing a communication with at least a second proxy device coupled to the local area network;

determining whether one of the proxy device and the second proxy device possesses a token authorizing establishment of the circuit connection for transfer of a frame, received from a first end station on the local area network, to the second local area network; and selectively transferring the frame to the second local area network based on whether the proxy device possesses the token.

2. The method of claim 1, further comprising generating the token by the proxy device in response to determining that the token is not present in any proxy device on the local area network, the selectively transferring step including transferring the frame in response to generation of the token.

3. The method of claim 2, further comprising transferring subsequent frames to the second local area network based on the proxy device possessing the token.

4. The method of claim 3, further comprising disconnecting the circuit, and passing the token following disconnection of the circuit to the second end station in response to a prescribed event.

5. The method of claim 2, further comprising:

receiving a second frame from the first end station for transfer to a third local area network reachable by the proxy device;

determining whether the second proxy device possesses a second token authorizing establishment of a second circuit connection for transfer of the second frame to the third local area network;

generating the second token for transfer of the second frame from the first local area network to the second local area network in response to determining that the second token is not present in said any proxy device on the local area network; and transferring the second frame to the third local area network based on the proxy device possessing the second token.

6. The method of claim 5, further comprising transferring subsequent frames to the second and third local area networks based on the proxy device possessing the token and the second token, respectively.

7. The method of claim 5, further comprising periodically outputting first and second frames indicating the presence of the token and the second token, respectively, onto the local area network.

8. The method of claim 2, further comprising periodically outputting a status frame indicating the possession of the token by the proxy device.

9. The method of claim 1, wherein the determining step includes:

sending a learning frame to the second proxy device, the learning frame including a query whether the token exists for establishment of the circuit connection to the second local area network; and determining within a prescribed interval whether the second proxy device transmits a reply to the query indicating the token exists.

10. The method of claim 9, wherein the selectively transferring step includes dropping the frame in response to receiving the reply within the prescribed interval indicating that the token exists and based on a determination that the proxy device does not possess the token.

11. The method of claim 10, further comprising:

determining whether the token continues to exist after a prescribed second interval following reception of the reply; and generating the token as a new token if the token is determined not to exist after the prescribed second interval.

12. The method of claim 11, wherein the step of determine whether the token continues to exist includes determining whether a status frame is received within the prescribed second interval indicating the existence of the token.

13. The method of claim 1, wherein the local area network is an Ethernet/IEEE 802.3 based local area network.

14. A proxy device configured for establishing a circuit connection between a local area network and another local area network via a wide area network, the proxy device including:

a first network port for communication with a second proxy device via the local area network;

a second network port for communication with the another local area network via the wide area network; and a control unit configured for establishing a communication link with the second proxy device and determining a presence of a token possessed by one of the proxy device and the second proxy device for establishment of the circuit connection, the control unit selectively transferring a frame received from an end station on the local area network to the another local area network based on the proxy device possessing the token.

15. The proxy device of claim 14, wherein the control unit is configured for generating the token in response to a determined absence of the token by any proxy device on the local area network, the control unit transferring the frame in response to generation of the token.

16. The proxy device of claim 15, wherein the control unit transfers subsequent frames received from the end station to the another local area network in response to continued possession of the token.

17. The proxy device of claim 16, wherein the control unit, in response to detecting a prescribed load balance condition, passes the token to the second proxy device via the local area network.

18. The proxy device of claim 15, further comprising a reachability cache for storing reachability information indicating the proxy device can reach another local area network via the wide area network, the control unit configured for selectively transferring a plurality of the frames to a plurality of the other local area networks, via the wide area network, based on possession of respective tokens.

19. The proxy device of claim 18, wherein the control unit periodically outputs status frames onto the local area network for each of the tokens possessed by the proxy device.

20. The proxy device of claim 14, wherein the control unit determines the presence of a token by outputting a learning frame onto the local area network and determining whether a response is received within a prescribed interval, following the learning frame, indicating that the token exists.

21. The proxy device of claim 20, wherein the control unit drops the frame in response to reception of the response within the prescribed interval.

22. The proxy device of claim 21, wherein the control unit generates a new token for establishment of the circuit connection if a second response is not received within a second prescribed interval following reception of the response indicating the continued existence of the token.

23. The proxy device of claim 14, wherein the local area network is an Ethernet/IEEE 802.3 based local area network.

24. A computer readable medium having stored thereon sequences of instructions for establishing, by a proxy device coupled to a local area network, a circuit connection with a second local area network via a wide area network, the sequences of instructions including instructions for performing the steps of:

establishing a communication with at least a second proxy device coupled to the local area network;

determining whether one of the proxy device and the second proxy device possesses a token authorizing establishment of the circuit connection for transfer of a frame, received from a first end station on the local area network, to the second local area network; and selectively transferring the frame to the second local area network based on whether the proxy device possesses the token.

25. The computer readable medium of claim 24, further comprising instructions for performing the step of generating the token by the proxy device in response to determining that the token is not present in any proxy device on the local area network, the selectively transferring step including transferring the frame in response to generation of the token.

26. The computer readable medium of claim 25, further comprising instructions for performing the step of transferring subsequent frames to the second local area network based on the proxy device possessing the token.

27. The computer readable medium of claim 26, further comprising instructions for performing the steps of disconnecting the circuit, and passing the token following disconnection of the circuit to the second end station in response to a prescribed event.

28. The computer readable medium of claim 25, further comprising instructions for performing the step of generating a plurality of tokens, each authorizing establishment of a corresponding circuit connection to another corresponding local area network.

29. The computer readable medium of claim 25, further comprising instructions for performing the step of periodically generating status frames for each of the tokens possessed by the proxy device.

30. The computer readable medium of claim 24, further comprising instructions for performing the steps of:

sending a learning frame to the second proxy device, the learning frame including a query whether the token exists for establishment of the circuit connection to the second local area network; and determining within a prescribed interval whether the second proxy device transmits a reply to the query indicating the token exists.

31. The computer readable medium of claim 30, wherein the selectively transferring step includes dropping the frame in response to receiving the reply within the prescribed interval indicating that the token exists and based on a determination that the proxy device does not possess the token.

32. The computer readable medium of claim 31, further comprising instructions for performing the steps of:

determining whether the token continues to exist after a prescribed second interval following reception of the reply; and generating the token as a new token if the token is determined not to exist after the prescribed second interval.

33. The computer readable medium of claim 32, wherein the step of determining whether the token continues to exist includes determining whether a status frame is received within the prescribed second interval indicating the existence of the token.

34. A method in a first local area network of intercommunication with a second local area network via a wide area network, the method comprising:

determining whether any of a plurality of proxy devices connected to the first local area network possesses a token authorizing establishment of a circuit connection for transfer of a frame, received from a first end station on the first local area network, to the second local area network;

if none of the proxy devices possesses the token, generating the token in one of the proxy devices; and transferring the frame to the second local area network by one of the proxy devices having possession of the token.

35. The method of claim 34, further comprising:

generating a second token in one of the proxy devices able to reach a third local area network, wherein the second token authorizes establishment of a second circuit connection between the first local area network and the third local area network; and transferring a second frame to the third local area network via the second circuit connection established by an identified one of the proxy devices able to the third local area network and possessing the second token.

36. The method of claim 35, further comprising transferring a plurality of frames between the first and third local area networks via the second circuit connection by the identified one proxy device possessing the second token.

37. The method of claim 36, further comprising:

detecting a prescribed load balancing condition by the identified one proxy device possessing the second token; and passing the second token to another one of the proxy devices able to reach the third local area network.

38. The method of claim 34, further comprising transferring a plurality of frames between the first and second local area networks via the circuit connection by the identified one proxy device possessing the token, the identified one proxy device holding the token until a prescribed event.

39. The method of claim 38, further comprising:

detecting a prescribed load balancing condition in the circuit connection by the identified one proxy device as said prescribed event; and passing the token to another one of the proxy devices according to a prescribed protocol.

40. The method of claim 38, further comprising periodically outputting a status frame each token status interval indicating the possession of the token by the identified one proxy device.

41. The method of claim 40, further comprising, in another proxy device not possessing the token:

determining whether the status frame is received within the token status interval; and if the status frame is not received within the token status interval, generating a new token authorizing establishment of another circuit connection for transfer of a frame from the first end station to the second local area network.

42. The method of claim 34, wherein the determining step includes:

outputting a learning frame by one of the proxy devices to the other proxy devices, the learning frame including a query whether the token exists for establishment of the circuit connection to the second local area network; and determining within a prescribed interval whether any of the other proxy devices transmits a reply to the query indicating the token exists.

43. A local area network, configured for internetwork communications via a wide area network, the local area network comprising:

a first end station configured for outputting a frame onto the local area network; and proxy devices configured for establishing a circuit connection on the wide area network for transfer of the frame to another network, each proxy device including:

(1) a reachability table identifying at least one other local area network reachable via the wide area network, and (2) a control unit configured for mediating with the other proxy devices for generation and possession of a token for each corresponding at least one other local area network, the control unit selectively forwarding the frame to the at least one other local area network based on possession of the corresponding token.

44. The network of claim 43, wherein the proxy devices identified as able to reach the at least one other local area network pass the corresponding token according to a prescribed protocol.

* * * * *